United States Patent
Ho et al.

(10) Patent No.: US 9,043,718 B2
(45) Date of Patent: May 26, 2015

(54) SYSTEM AND METHOD FOR APPLYING A TEXT PREDICTION ALGORITHM TO A VIRTUAL KEYBOARD

(75) Inventors: Colin Stephen Samuel Ho, Ottawa (CA); Douglas Rider, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 331 days.

(21) Appl. No.: 12/478,854

(22) Filed: Jun. 5, 2009

(65) Prior Publication Data

US 2010/0313120 A1  Dec. 9, 2010

(51) Int. Cl.
G06F 3/14  (2006.01)
G06F 3/023  (2006.01)
G06F 3/0488  (2013.01)
G06F 17/27  (2006.01)

(52) U.S. Cl.
CPC .......... *G06F 3/0237* (2013.01); *G06F 3/04886* (2013.01); *G06F 17/276* (2013.01)

(58) Field of Classification Search
USPC .................................. 715/773, 772, 825, 864
See application file for complete search history.

(56) References Cited

U.S. PATENT DOCUMENTS

| 6,271,835 | B1 * | 8/2001 | Hoeksma ........................ 345/168 |
| 7,030,863 | B2 * | 4/2006 | Longe et al. .................... 345/173 |
| 2004/0104896 | A1 | 6/2004 | Suraqui |
| 2005/0240879 | A1 * | 10/2005 | Law et al. ....................... 715/773 |
| 2007/0216658 | A1 | 9/2007 | Rainisto |
| 2007/0247442 | A1 * | 10/2007 | Andre et al. ................... 345/173 |
| 2007/0256029 | A1 * | 11/2007 | Maxwell ......................... 715/834 |
| 2009/0007001 | A1 * | 1/2009 | Morin et al. ................... 715/773 |
| 2009/0158144 | A1 * | 6/2009 | Griffin ............................ 715/261 |
| 2009/0259962 | A1 * | 10/2009 | Beale ............................... 715/773 |
| 2010/0289752 | A1 * | 11/2010 | Birkler ............................ 345/173 |

FOREIGN PATENT DOCUMENTS

| EP | 1 569 079 | 8/2005 |
| WO | WO 2007/032843 | 3/2007 |

OTHER PUBLICATIONS

Communication from European Patent Office for European Application No. 09162006.2, Jan. 25, 2010.
Decision to Refuse a European Patent Application for Application No. 09162006.2, from the European Patent Office, dated Jan. 27, 2011.
Summons to Attend Oral Proceedings for Application No. 09162006.2, from the European Patent Office, dated Sep. 6, 2010.

(Continued)

*Primary Examiner* — Thanh Vu
(74) *Attorney, Agent, or Firm* — Fish & Richardson P.C.

(57) ABSTRACT

An electronic device for text prediction in a virtual keyboard. The device includes a memory including an input determination module for execution by the microprocessor, the input determination module being configured to: receive signals representing input at the virtual keyboard, the virtual keyboard being divided into a plurality of subregions, the plurality of subregions including at least one subregion being associated with two or more characters and/or symbols of the virtual keyboard; identify a subregion on the virtual keyboard corresponding to the input; determine any character or symbol associated with the identified subregion; and if there is at least one determined character or symbol, provide the at least one determined character or symbol to a text prediction algorithm.

18 Claims, 7 Drawing Sheets

(56) References Cited

OTHER PUBLICATIONS

Office Communication for Application No. 09162006.2 from the European Patent Office, dated Apr. 23, 2010.
Brian Lam, "iPhone-ish Virtual Keyboard for the Nokia N800", web news article, Jul. 30, 2007.
Dusan Belic, "Freeware of the Day: TouchPal Virtual Keyboard for Windows Mobile", web news article, Oct. 10, 2007.
Office Action for Application No. 2,706,055, from the Canadian Intellectual Property Office, dated Jan. 23, 2013.
Office Action for Application No. 2,706,055, from the Canadian Intellectual Property Office, dated Mar. 6, 2014.

* cited by examiner

SYSTEM AND METHOD FOR APPLYING A TEXT PREDICTION ALGORITHM TO A VIRTUAL KEYBOARD

TECHNICAL FIELD

The present disclosure relates generally to electronic devices including touch screen display devices having virtual keyboards. In particular, the present disclosure relates to systems and methods for applying a text prediction algorithm in such devices.

BACKGROUND

Electronic devices, including portable electronic devices, have gained widespread use and can provide a variety of functions including, for example, telephonic, electronic messaging and other personal information manager (PIM) application functions. Portable electronic devices can include several types of devices including mobile stations such as simple cellular telephones, smart telephones, wireless PDAs, and laptop computers with wireless 802.11 or Bluetooth capabilities. These devices run on a wide variety of networks from data-only networks such as Mobitex and DataTAC to complex voice and data networks such as GSM/GPRS, CDMA, EDGE, UMTS and CDMA2000 networks.

Portable electronic devices such as PDAs or smart telephones are generally intended for handheld use and ease of portability. Smaller devices are generally desirable for portability. A touch screen display for input and output is particularly useful on such handheld devices as such handheld devices are small and are therefore limited in space available for user input and output devices. A touch screen display may comprise a virtual keyboard, and the user may interact with the virtual keyboard by touching regions on the touch screen display that correspond with individual displayed keys. However, the precise location where the user intended to touch may be difficult to accurately detect. This may be exacerbated when the user interacts with the touch screen display using an object with a large surface area, such as a finger.

Improvements in touch screen devices are therefore desirable.

BRIEF DESCRIPTION OF THE DRAWINGS

Embodiments of the present disclosure will now be described, by way of example only, with reference to the attached Figures, wherein.

DETAILED DESCRIPTION

Figure 1:
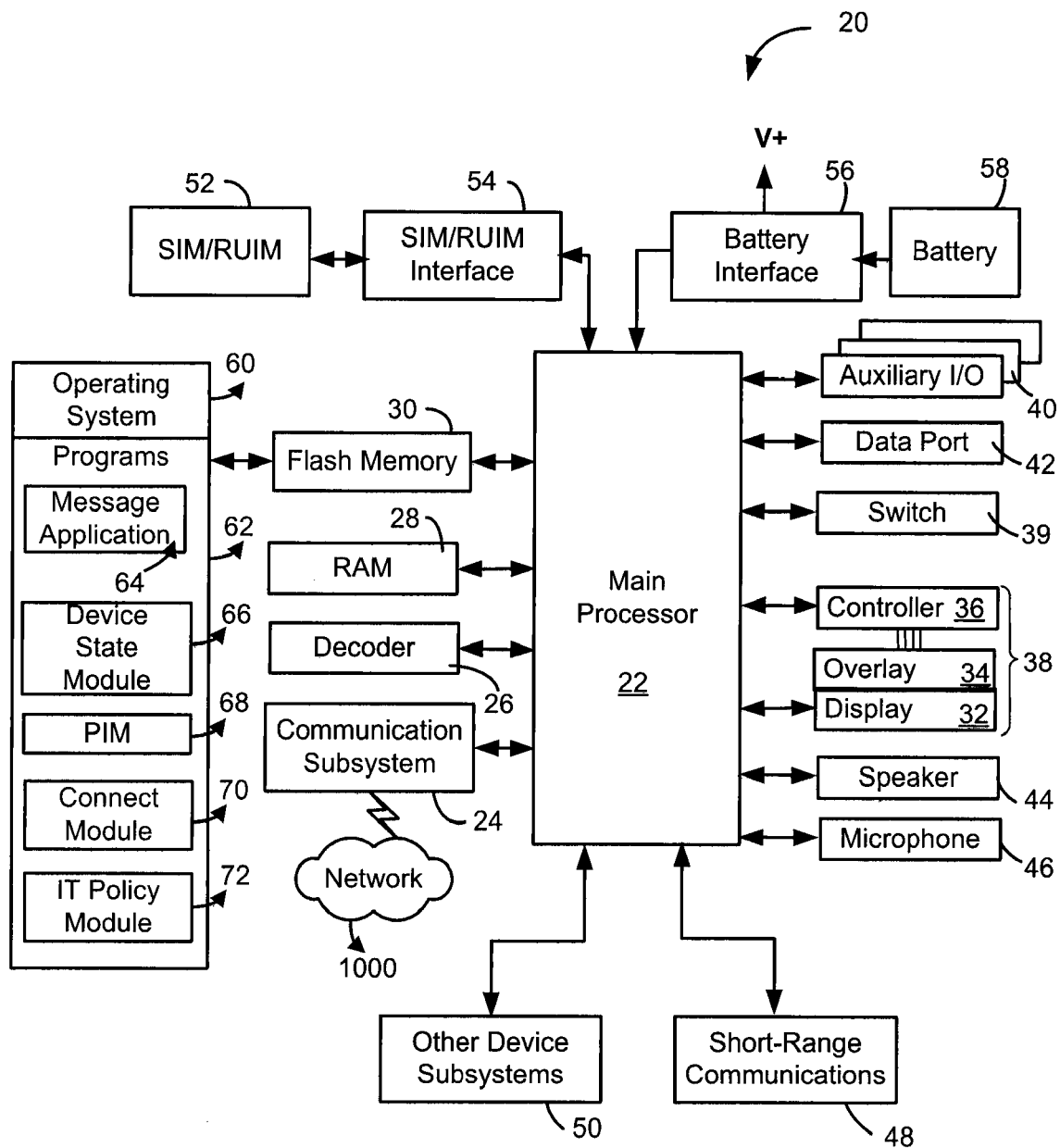
FIG. 1 is a block diagram of a portable electronic device according to one example.

In some aspects, the present disclosure provides an electronic device for text prediction in a virtual keyboard, the device comprising: a microprocessor for controlling the operation of the device; a touch screen display coupled to the microprocessor for accepting user input and for displaying a user interface including the virtual keyboard; and a memory coupled to the microprocessor; the memory including an input determination module for execution by the microprocessor, the input determination module being configured to: receive signals representing input at the virtual keyboard, the virtual keyboard being divided into a plurality of subregions, the plurality of subregions including at least one subregion associated with two or more characters and/or symbols of the virtual keyboard; identify a subregion on the virtual keyboard corresponding to the input; determine any character or symbol associated with the identified subregion; and if there is at least one determined character or symbol, provide the at least one determined character or symbol to a text prediction algorithm.

In other aspects, the present disclosure provides a method for text prediction in a virtual keyboard of an electronic device, the device having a touch screen display for accepting user input and for displaying the virtual keyboard, the method comprising: receiving signals representing input at the virtual keyboard, the virtual keyboard being divided into a plurality of subregions, the plurality of subregions including at least one subregion associated with two or more characters and/or symbols of the virtual keyboard; identifying a subregion on the virtual keyboard corresponding to the input; determining any character or symbol associated with the identified subregion; and if there is at least one determined character or symbol, providing the at least one determined character or symbol to a text prediction algorithm.

In other aspects, the present disclosure provides a computer program product having a computer readable medium having computer executable instructions tangibly recorded thereon for text prediction in a virtual keyboard of an electronic device, the device having a touch screen display for accepting user input and for displaying the virtual keyboard, the computer program product comprising: code for receiving signals representing input at the virtual keyboard, the virtual keyboard being divided into a plurality of subregions, the plurality of subregions including at least one subregion associated with two or more characters and/or symbols of the virtual keyboard; code for identifying a subregion on the virtual keyboard corresponding to the input; code for determining any character or symbol associated with the identified subregion; and code for, if there is at least one determined character or symbol, providing the at least one determined character or symbol to a text prediction algorithm.

In some embodiments, the system, method and computer program product may also include determining a predicted text based on the at least one determined character or symbol using the text prediction algorithm; and transmitting a signal representing the predicted text. The characters may be alphanumeric characters.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. A person skilled in the art would understand that variations and modifications, both those currently known and those that may be later developed, are possible within the scope of the disclosure. Also, the description is not to be considered as limiting the scope of the embodiments described herein.

The embodiments described herein generally relate to an electronic device including a touch screen display. Such electronic devices may in particular be portable electronic devices, including communication devices. Examples of portable electronic devices include mobile, or handheld, wireless communication devices such as pagers, cellular phones, cellular smart-phones, wireless organizers, personal digital assistants, wirelessly enabled notebook computers and the like.

The portable electronic device may be a two-way communication device with advanced data communication capabilities including the capability to communicate with other portable electronic devices or computer systems through a network of transceiver stations. The portable electronic device may also have the capability to allow voice communication. Depending on the functionality provided by the portable electronic device, it may be referred to as a data messaging device, a two-way pager, a cellular telephone with data messaging capabilities, a wireless Internet appliance, or a data communication device (with or without telephony capabilities). The portable electronic device may also be a portable device without wireless communication capabilities as a handheld electronic game device, digital photograph album, digital camera and the like.

Referring first to FIG. 1, there is shown therein a block diagram of an example embodiment of a portable electronic device 20. The portable electronic device 20 includes a number of components such as the main processor 22 that controls the overall operation of the portable electronic device 20. Communication functions, including data and voice communications, are performed through a communication subsystem 24. Data received by the portable electronic device 20 can be decompressed and decrypted by a decoder 26, operating according to any suitable decompression techniques (e.g. YK decompression, and other known techniques) and encryption techniques (e.g. using an encryption technique such as Data Encryption Standard (DES), Triple DES, or Advanced Encryption Standard (AES)). The communication subsystem 24 may receive messages from and send messages to a wireless network 1000. In this example embodiment of the portable electronic device 20, the communication subsystem 24 may be configured in accordance with the Global System for Mobile Communication (GSM) and General Packet Radio Services (GPRS) standards. The GSM/GPRS wireless network is used worldwide. New standards such as Enhanced Data GSM Environment (EDGE) and Universal Mobile Telecommunications Service (UMTS) are believed to have similarities to the network behavior described herein, and it will also be understood by persons skilled in the art that the embodiments described herein may use any other suitable standards that are developed in the future. The wireless link connecting the communication subsystem 24 with the wireless network 1000 may represent one or more different Radio Frequency (RF) channels, operating according to defined protocols specified for GSM/GPRS communications. With newer network protocols, these channels may be capable of supporting both circuit switched voice communications and packet switched data communications.

Although the wireless network 1000 associated with the portable electronic device 20 may be a GSM/GPRS wireless network in one example implementation, other wireless networks may also be associated with the portable electronic device 20 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA1000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems. The main processor 22 may also interact with additional subsystems such as a Random Access Memory (RAM) 28, a flash memory 30, a display 32 with a touch-sensitive overlay 34 connected to an electronic controller 36 that together make up a touch screen display 38, a switch 39, an auxiliary input/output (I/O) subsystem 40, a data port 42, a speaker 44, a microphone 46, short-range communications 48 and other device subsystems 50. The touch-sensitive overlay 34 and the electronic controller 36 provide a touch-sensitive input device and the main processor 22 may interact with the touch-sensitive overlay 34 via the electronic controller 36.

Some of the subsystems of the portable electronic device 20 may perform communication-related functions, whereas other subsystems may provide "resident" or on-device functions. By way of example, the display 32 and the touch-sensitive overlay 34 may be used for both communication-related functions, such as entering a text message for transmission over the network 1000, and device-resident functions such as a calculator or task list.

The portable electronic device 20 can send and receive communication signals over the wireless network 1000 after network registration or activation procedures have been completed. Network access may be associated with a subscriber or user of the portable electronic device 20. To identify a subscriber according to the present embodiment, the portable electronic device 20 may use a SIM/RUIM card 52 (i.e. Subscriber Identity Module or a Removable User Identity Module) inserted into a SIM/RUIM interface 54 for communication with a network such as the network 1000. The SIM/RUIM card 52 is one type of a conventional "smart card" that can be used to identify a subscriber of the portable electronic device 20 and to personalize the portable electronic device 20, among other things. In an embodiment the portable electronic device 20 may not be fully operational for communication with the wireless network 1000 without the SIM/RUIM card 52. By inserting the SIM/RUIM card 52 into the SIM/RUIM interface 54, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM/RUIM card 52 may include a processor and memory for storing information. Once the SIM/RUIM card 52 is inserted into the SIM/RUIM interface 54, it may be coupled to the processor 22. In order to identify the subscriber, the SIM/RUIM card 52 can include some user parameters such as an International Mobile Subscriber Identity (IMSI). An advantage of using the SIM/RUIM card 52 is that a subscriber is not necessarily bound by any single physical portable electronic device. The SIM/RUIM card 52 may store additional subscriber information for a portable electronic device as well, including datebook (or calendar) information and recent call information. Alternatively, user identification information can also be programmed into the flash memory 30.

The portable electronic device 20 may be a battery-powered device and may include a battery interface 56 for receiving one or more rechargeable batteries 58. In at least some embodiments, the battery 58 can be a smart battery with an embedded microprocessor. The battery interface 56 may be coupled to a regulator (not shown), which may assist the battery 58 in providing power V+ to the portable electronic device 20. Although current technology may make use of a battery, future technologies such as micro fuel cells may provide the power to the portable electronic device 20.

The portable electronic device 20 may also include an operating system 60 and software components 62 to 72 which are described in more detail below. The operating system 60 and the software components 62 to 72 that are executed by the main processor 22 are typically stored in a persistent store such as the flash memory 30, which may alternatively be a read-only memory (ROM) or similar storage element (not shown). Those skilled in the art will appreciate that portions of the operating system 60 and the software components 62 to 72, such as specific device applications, or parts thereof, may be temporarily loaded into a volatile store such as the RAM 28. Other software components can also be included, as is well known to those skilled in the art.

The subset of software applications 62 that control basic device operations, including data and voice communication applications, may typically be installed on the portable electronic device 20 during its manufacture. Other software applications may include a message application 64 that can be any suitable software program that allows a user of the portable electronic device 20 to send and receive electronic messages. Various alternatives exist for the message application 64 as is well known to those skilled in the art. Messages that have been sent or received by the user are typically stored in the flash memory 30 of the portable electronic device 20 or some other suitable storage element in the portable electronic device 20. In at least some embodiments, some of the sent and received messages may be stored remotely from the device 20 such as in a data store of an associated host system that the portable electronic device 20 communicates with.

The software applications can further include a device state module 66, a Personal Information Manager (PIM) 68, and other suitable modules (not shown). The device state module 66 may provide persistence, i.e. the device state module 66 ensures that important device data is stored in persistent memory, such as the flash memory 30, so that the data is not lost when the portable electronic device 20 is turned off or loses power.

The PIM 68 may include functionality for organizing and managing data items of interest to the user, such as, but not limited to, e-mail, contacts, calendar events, voice mails, appointments, and task items. A PIM application may have the ability to send and receive data items via the wireless network 1000. PIM data items may be seamlessly integrated, synchronized, and updated via the wireless network 1000 with the portable electronic device subscriber's corresponding data items stored and/or associated with a host computer system. This functionality creates a mirrored host computer on the portable electronic device 20 with respect to such items. This can be particularly advantageous when the host computer system is the portable electronic device subscriber's office computer system.

The portable electronic device 20 may also include a connect module 70, and an information technology (IT) policy module 72. The connect module 70 may implement the communication protocols that are required for the portable electronic device 20 to communicate with the wireless infrastructure and any host system, such as an enterprise system, that the portable electronic device 20 is authorized to interface with.

The connect module 70 may include a set of APIs that can be integrated with the portable electronic device 20 to allow the portable electronic device 20 to use any number of services associated with the enterprise system. The connect module 70 may allow the portable electronic device 20 to establish an end-to-end secure, authenticated communication pipe with the host system. A subset of applications for which access is provided by the connect module 70 can be used to pass IT policy commands from the host system to the portable electronic device 20. This can be done in a wireless or wired manner. These instructions can then be passed to the IT policy module 72 to modify the configuration of the device 20. Alternatively, in some cases, the IT policy update can also be done over a wired connection.

Other types of software applications can also be installed on the portable electronic device 20. These software applications can be third party applications, which are added after the manufacture of the portable electronic device 20. Examples of third party applications include games, calculators, utilities, etc.

The additional applications can be loaded onto the portable electronic device 20 through at least one of the wireless network 1000, the auxiliary I/O subsystem 40, the data port 42, the short-range communications subsystem 48, or any other suitable device subsystem 50. This flexibility in application installation may increase the functionality of the portable electronic device 20 and may provide enhanced on-device functions, communication-related functions, or both. For example, secure communication applications may enable electronic commerce functions and other such financial transactions to be performed using the portable electronic device 20.

The data port 42 may enable a subscriber to set preferences through an external device or software application and may extend the capabilities of the portable electronic device 20 by providing for information or software downloads to the portable electronic device 20 other than through a wireless communication network. The alternate download path may, for example, be used to load an encryption key onto the portable electronic device 20 through a direct and thus reliable and trusted connection to provide secure device communication.

The data port 42 can be any suitable port that enables data communication between the portable electronic device 20 and another computing device. The data port 42 can be a serial or a parallel port. In some instances, the data port 42 can be a USB port that includes data lines for data transfer and a supply line that can provide a charging current to charge the battery 58 of the portable electronic device 20.

The short-range communications subsystem 48 may provide for communication between the portable electronic device 20 and different systems or devices, without the use of the wireless network 1000. For example, the short-range communications subsystem 48 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download may be processed by the communication subsystem 24 and input to the main processor 22. The main processor 22 may process the received signal for output to the display 32 or alternatively to the auxiliary I/O subsystem 40. A subscriber may also compose data items, such as e-mail messages, for example, using the touch-sensitive overlay 34 on the display 32 that are part of the touch screen display 38, and possibly the auxiliary I/O subsystem 40. The auxiliary I/O subsystem 40 may include devices such as: a mouse, track ball, infrared fingerprint detector, or a roller wheel with dynamic button pressing capability. A composed item may be transmitted over the wireless network 1000 through the communication subsystem 24.

For voice communications, the overall operation of the portable electronic device 20 may be substantially similar, except that the received signals may be output to the speaker 44, and signals for transmission may be generated by the microphone 46. Alternative voice or audio I/O subsystems, such as a voice message recording subsystem, can also be implemented on the portable electronic device 20. Although voice or audio signal output may be accomplished primarily through the speaker 44, the display 32 can also be used to provide additional information such as the identity of a calling party, duration of a voice call, or other voice call related information.

Figure 2:
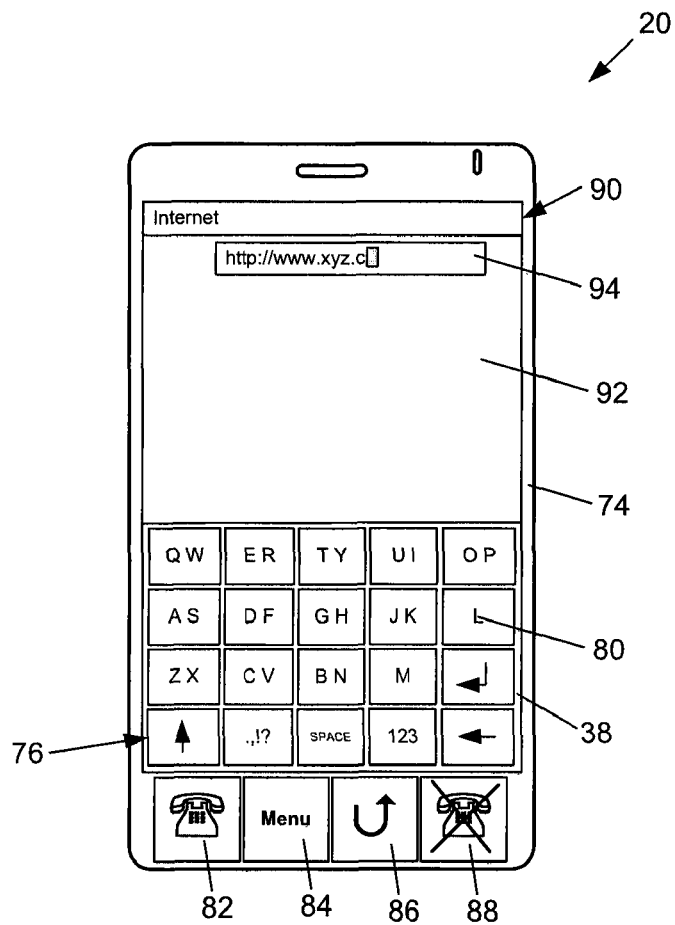
FIG. 2 is a front view of an example portable electronic shown in a portrait orientation.

Reference is now made to FIG. 2, which shows a front view of an example portable electronic device 20 in portrait orientation. The portable electronic device 20 may include a housing 74 that houses the internal components that are shown in FIG. 1 and frames the touch screen display or touch-sensitive display 38 such that the touch screen display 38 is exposed for user-interaction therewith when the portable electronic device 20 is in use. In the example orientation shown in FIG. 2, the touch screen display 38 may include a portrait mode virtual keyboard 76 for user entry of data in the form of, for example, text during operation of the portable electronic device 20. It will be appreciated that such a virtual keyboard 76 may be used for data entry in any suitable application such as in an electronic mail application, during electronic mail composition or in any other suitable application. The portrait mode virtual keyboard 76 of FIG. 2 may be provided for data entry in an Internet browser application and is shown as a reduced keyboard for example purposes. The present disclosure is not limited to the portrait mode virtual keyboard 76 shown, as other keyboards including other reduced keyboards or full keyboards are possible. Suitable keyboards may include full or reduced QWERTY keyboards, full or reduced Dvorak keyboards, and other full or reduced keyboards, including keyboards adapted for non-English languages. Other suitable keyboards include AZERTY keyboards, QWERTZ keyboards or the ITU Standard E.161 alphanumeric telephone keypad layout, such as those found on telephones.

The touch screen display 38 can be any suitable touch screen display such as a capacitive touch screen display. A capacitive touch screen display 38 may include the display device, such as an LCD display 32 and the touch-sensitive overlay 34, in the form of a capacitive touch-sensitive overlay 34. It will be appreciated that the capacitive touch-sensitive overlay 34 may include a number of layers in a stack and may be fixed to the display 32 via a suitable optically clear adhesive. The layers can include, for example a substrate fixed to the LCD display 32 by a suitable adhesive, a ground shield layer, a barrier layer, a pair of capacitive touch sensor layers separated by a substrate or other barrier layer, and a cover layer fixed to the second capacitive touch sensor layer by a suitable adhesive. The capacitive touch sensor layers can be any suitable material such as patterned indium tin oxide (ITO).

Figure 3:
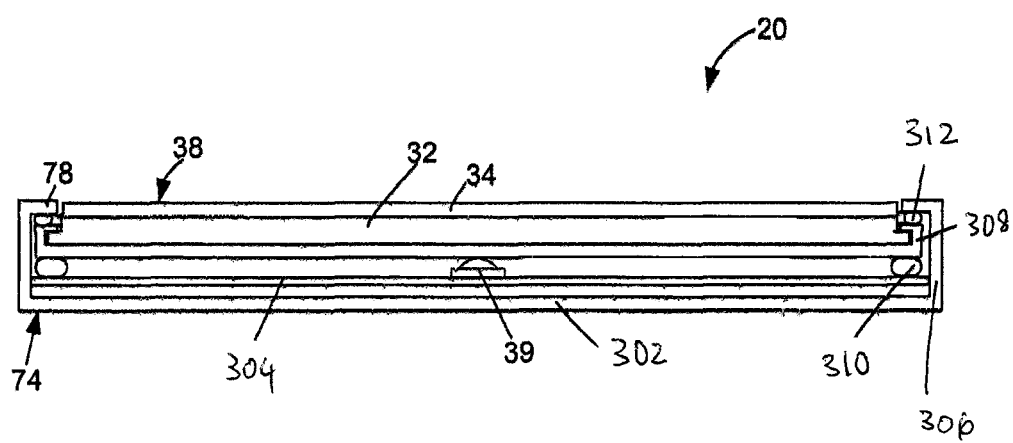
FIG. 3 is a simplified sectional side view of the portable electronic device of FIG. 2 (not to scale), with a switch shown in a rest position.

Reference is now made to FIG. 3, showing a simplified sectional side view of the portable electronic device of FIG. 2 (not to scale), with a switch shown in a rest position. As shown in FIG. 3, the housing 74 may include a back 302, a frame 78, which frames the touch-sensitive display 38, sidewalls 306 that extend between and generally perpendicular to the back 302 and the frame 78, and a base 304 that is spaced from and generally parallel to the back 302. The base 304 can be any suitable base and can include, for example, a printed circuit board or flex circuit board. The back 302 may include a plate (not shown) that is releasably attached for insertion and removal of, for example, the battery 58 and the SIM/RUIM card 52 described above. It will be appreciated that the back 302, the sidewalls 306 and the frame 78 can be injection molded, for example. In the example portable electronic device 20 shown in FIG. 2, the frame 78 may be generally rectangular with rounded corners although other shapes are possible.

The display 32 and the touch-sensitive overlay 34 can be supported on a support tray 308 of suitable material such as magnesium for providing mechanical support to the display 32 and touch-sensitive overlay 34. The display 32 and touch-sensitive overlay 34 may be biased away from the base 304, toward the frame 78 by biasing elements 310 such as gel pads between the support tray 308 and the base 304. Compliant spacers 312, which can also be in the form of gel pads for example, may be located between an upper portion of the support tray 308 and the frame 78. The touch screen display 38 may be moveable within the housing 74 as the touch screen display 38 can be moved toward the base 304, thereby compressing the biasing elements 310. The touch screen display 38 can also be pivoted within the housing 74 with one side of the touch screen display 38 moving toward the base 304, thereby compressing the biasing elements 310 on the same side of the touch screen display 38 that moves toward the base 304.

In the present example, the switch 39 may be supported on one side of the base 304 which can be a printed circuit board while the opposing side provides mechanical support and electrical connection for other components (not shown) of the portable electronic device 20. The switch 39 can be located between the base 304 and the support tray 308. The switch 39, which can be a mechanical dome-type switch, for example, can be located in any suitable position such that displacement of the touch screen display 38 resulting from a user pressing the touch screen display 38 with sufficient force to overcome the bias and to overcome the actuation force for the switch 39, depresses and actuates the switch 39. In the present embodiment the switch 39 may be in contact with the support tray 308. Thus, depression of the touch screen display 38 by user application of a force thereto, may cause actuation of the switch 39, thereby providing the user with a positive tactile feedback during user interaction with the user interface of the portable electronic device 20. The switch 39 is not actuated in the rest position shown in FIG. 3, absent applied force by the user. It will be appreciated that the switch 39 can be actuated by pressing anywhere on the touch screen display 38 to cause movement of the touch screen display 38 in the form of movement parallel with the base 304 or pivoting of one side of the touch screen display 38 toward the base 304. The switch 39 may be connected to the processor 22 and can be used for further input to the processor when actuated. Although a single switch is shown any suitable number of switches can be used.

A touch event may be detected upon user touching of the touch screen display 38. Such a touch event can be determined upon a user touch at the touch screen display 38 for selection of, for example, a feature in a list, such as a message or other feature of for scrolling in the list or selecting a virtual input key. Signals may be sent from the touch-sensitive overlay 34 to the controller 36 when a suitable object such as a finger or other conductive object held in the bare hand of a user, is detected. Thus, the touch event may be detected and the X and Y location of the touch may be determined. The X and Y location of the touch may be determined to fall within the touch-sensitive area defined by the boundary on the touch screen display 38.

In the present example, the X and Y location of a touch event may be both determined with the X location determined by a signal generated as a result of capacitive coupling with one of the touch sensor layers and the Y location determined by the signal generated as a result of capacitive coupling with the other of the touch sensor layers. Each of the touch-sensor layers may provide a signal to the controller 36 as a result of capacitive coupling with a suitable object such as a finger of a user or a conductive object held in a bare hand of a user resulting in a change in the electric field of each of the touch sensor layers. The signals may represent the respective X and Y touch location values. It will be appreciated that other attributes of the user's touch on the touch screen display 38 can be determined. For example, the size and the shape of the touch on the touch screen display 38 can be determined in addition to the location (e.g., X and Y values) based on the signals received at the controller 36 from the touch sensor layers.

Referring to FIG. 2, it will be appreciated that a user's touch on the touch screen display 38 may be determined by determining the X and Y touch location and user-selected input may be determined based on the X and Y touch location and the application executed by the processor 22. This determination may be carried out by the processor 22 using one or more software modules 62, including the specific application being executed. In the example screen shown in the front view of FIG. 2, the application may provide the virtual keyboard 76 having a plurality of virtual input keys or buttons, which can be selected by the user. The user selected virtual input key may be matched to the X and Y touch location. Thus, the button selected by the user may be determined based on the X and Y touch location and the application. In the example shown in FIG. 2, the user may enter text via the virtual keyboard 76, selecting characters or symbols associated with the virtual input keys, such as alphanumeric characters from the virtual keyboard 76 by touching the touch screen display at the location of the characters, corresponding to the virtual input keys, of the virtual keyboard 76. In example embodiments of the portable electronic device 20, the text or data entry may be accomplished by a "click to enter" operation. Once the user has selected a character or symbol, the character or symbol may be entered by depressing the virtual input key on the touch screen display 38 with sufficient force to overcome the bias of the touch screen display 38 and the actuation force of the switch 39, to cause movement of the touch screen display 38 and actuation of the switch 39. The selection of the virtual input key 80 (e.g., based on the X and Y location on the touch screen display) and the actuation of the switch 39 may result in signals that may be received by the main processor 22, thereby entering the corresponding character or symbol for rendering on the touch screen display. The "click to enter" operation may provide a tactile feedback confirming the entry to the user, thereby reducing the chance of inadvertent double entry requiring correction. This may also reduce the need for additional user interaction and use time thereby, reducing battery consumption. The click entry may also allow the user to touch the device and ensure the correct character or symbol is selected before entry of that character or symbol by clicking. In general, the characters may be alphanumeric characters, although other characters may also be possible, such as characters for non-English languages.

According to the present example as illustrated in FIG. 2, the main processor 22 may receive a user-selection of an Internet browser application for browsing the Internet by, for example, determination of a touch event at an Internet browser icon (not shown) displayed on the touch screen display 38.

For illustrative purposes, the virtual keyboard 76 may be rendered in the portrait mode as shown in FIG. 2. Devices, such as accelerometers, can be used to determine the relative orientation of the portable electronic device 20 and change the orientation of the touch screen display accordingly. In the present example, the portrait mode virtual keyboard 76 may be a reduced QWERTY keyboard in which multiple alphanumeric characters and symbols may share virtual input keys or buttons 80. The virtual input keys or buttons 80 may be rendered with the alphanumeric characters and other keyboard buttons displayed in an upright position for the user. The portable electronic device 20 can be operated in any suitable mode for determining a user-desired one of the letters upon determination of a touch event at the respective one of the virtual input keys buttons 80 of the virtual keyboard 76. For example, letters can be selected using a single-tap mode, multi-tap mode, a text prediction mode or using any other suitable mode. The portable electronic device 20 according to the present example may also include four physical buttons 82, 84, 86, 88 in the housing 74 for user-selection for performing functions or operations including an "off-hook" button 82 for placing an outgoing cellular telephone call or receiving an incoming cellular telephone call, a Menu button 84 for displaying a context-sensitive menu or submenu, an escape button 86 for returning to a previous screen or exiting an application, and an "on-hook" button 88 for ending a cellular telephone call. The remainder of the buttons shown on the face of the example portable electronic device of FIG. 2 may be virtual buttons or input keys 80 on the touch screen display 38.

Along with the virtual keyboard 76, a display area may be rendered, which in the present example may be a portrait mode display area 90 that is a portrait mode Internet browser display screen 92. The display area may be provided in the portrait mode as a result of determination of the orientation at the accelerometer (not shown). The display area may be rendered above the portrait mode virtual keyboard 76 when the portable electronic device 20 is in the portrait orientation.

As a result of user touching any of the virtual buttons or input keys 80 of the virtual keyboard 76 and actuation of the switch 39, data input received from the virtual keyboard 76 may be rendered in a data entry field 94 of the Internet browser display screen 92. As shown, input may be received in the form of user selection of characters or symbols by touching the virtual buttons or input keys 80 so as to select the desired character or symbol associated with the virtual button or input key 80 in either the portrait mode or landscape mode, and entry by actuation of the switch 39. In the example shown in FIG. 2, the user enters "http://www.xyz.c" and the data received may be displayed in the data entry field 94 of the portrait mode Internet browser display screen 92.

When entering data, the user may turn the portable electronic device 20 to a different orientation to provide a different keyboard layout such as to change from a reduced keyboard layout in the portrait orientation to a full QWERTY keyboard layout in the landscape orientation, as in the present example. In another example, the user may also choose to turn the portable electronic device 20 to provide a different display area for the application.

Figure 4:
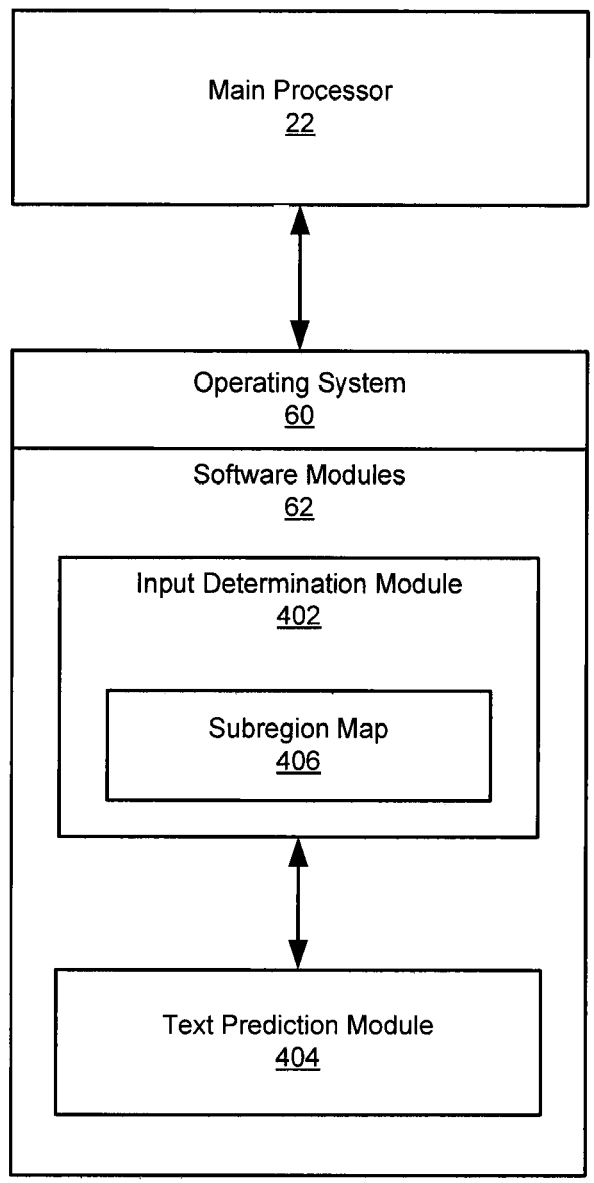
FIG. 4 is a block diagram of the contents of a memory of the portable electronic device of FIG. 2.

Reference is now made to FIG. 4, which shows a simplified block diagram of an example embodiment of the portable electronic device 20 suitable for applying a text prediction method to a virtual keyboard 76. This block diagram is similar to that of FIG. 1, but has been simplified for ease of understanding. The main processor 22 may communicate with the operating system 60. The operating system 60 may include software modules 62, as described above. In particular, the software modules 62 may include an input determination module 402 and a text prediction module 404. In other example embodiments, the input determination module 402 and the text prediction module 404 may reside in the Random Access Memory (RAM) 28, the flash memory 30 or other subsystems. The input determination module 402 may determine an intended input character or symbol at the virtual keyboard 76. The input determination module 402 may include a subregion map 406 to assist in this function.

The main processor 22 may transmit a signal representing an input at the virtual keyboard 76 to the operating system 60. This signal may be received at the input determination module 402. The character(s) or symbol(s) determined by the input determination module 402 may be provided to the text prediction module 404 as a signal representing the determined character(s) or symbol(s). The text prediction module 404 may use the determined character(s) or symbol(s) in a text prediction algorithm to predict an intended input text. Text predicted by the text prediction module 404 may be sent to the main processor 22 in the form of a signal representing the predicted text. The predicted text may be further processed by the main processor 22, including displaying the predicted text on the display 32.

Although the input determination module 402 and the text prediction module 404 are shown as separate modules in this embodiment, the input determination module 402 may be part of the text prediction module 404. The functions of the two modules 402, 404 may be carried out by a single module. Moreover, although the subregion map 406 is shown as being stored in the input determination module 402, the subregion map 406 may be stored in the text prediction module 404 where the input determination module 402 is part of the text prediction module 404, or the subregion map 406 may be stored elsewhere in the Random Access Memory (RAM) 28 or the flash memory 30.

The input determination module 402 may be configured to accommodate a plurality of virtual keyboards 76, including full or reduced QWERTY keyboard layouts, full or reduced Dvorak keyboard layouts, or full or reduced keyboards adapted for non-English languages. The subregion map 406 may similarly be configured to accommodate a plurality of virtual keyboards 76.

The text prediction module 404 may be configured to apply any one or more text prediction algorithms among those commonly known to persons skilled in the art. Such text prediction algorithms may include adaptive text prediction algorithms and text prediction algorithms for non-English languages. Suitable text prediction algorithms may include SureType™, T9™, iTap™, and LetterWise™, among others. The text prediction module 404 may be configured to carry out a selected text prediction algorithm based on a selection from a user.

Thus, the portable electronic device 20 may include computer executable programmed instructions for directing the portable electronic device 20 to implement various applications. The programmed instructions may be embodied in the one or more software modules 62 resident in the flash memory 30 of the portable electronic device 20. Alternatively, the programmed instructions may be embodied in a computer program product having a computer readable medium (such as a DVD, CD, floppy disk or other storage media) with computer executable instructions tangibly recorded thereon, which may be used for transporting the programmed instructions to the flash memory 30 of the portable electronic device 20. Alternatively, the programmed instructions may be embedded in a computer-readable, signal-bearing medium that is uploaded to the wireless network 1000 by a vendor or supplier of the programmed instructions, and this signal-bearing medium may be downloaded to the portable electronic device 20 from, for example, the wireless network 1000 by end users.

Figure 5A:
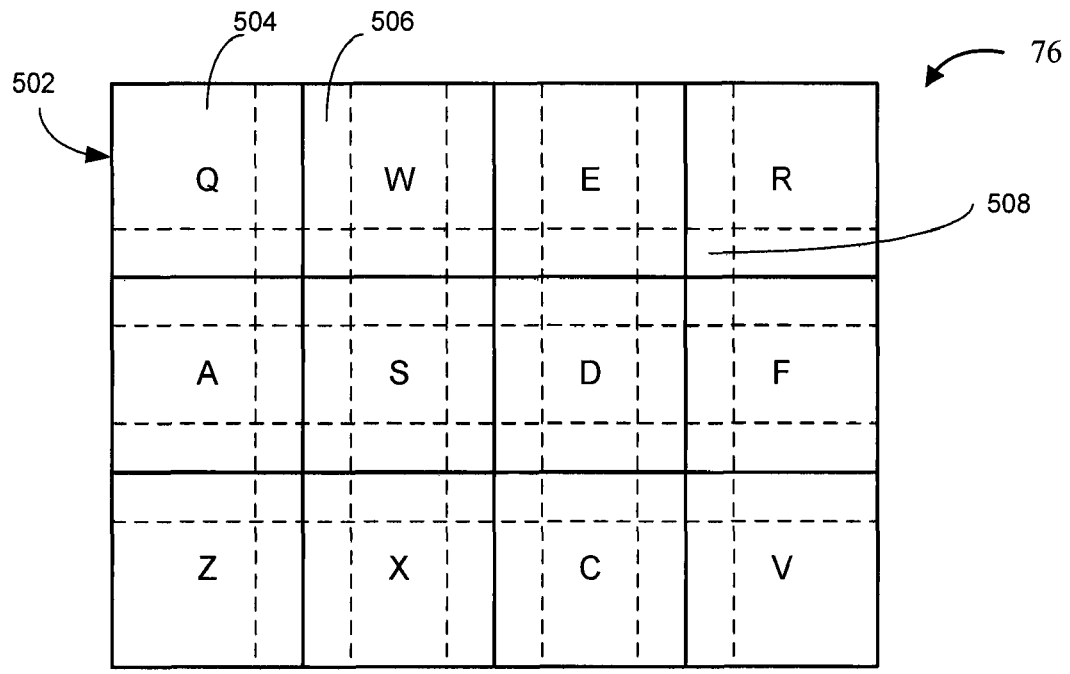
FIG. 5A is a simplified virtual keyboard in accordance with an embodiment of the present disclosure.

Reference is now made to FIG. 5A, showing a simplified virtual keyboard 76 in an embodiment of the present disclosure. For simplicity, only a portion of the virtual keyboard 76 is shown, and all keys are aligned to each other. In this example embodiment, the virtual keyboard 76 is a full QWERTY keyboard. Other keyboard layouts may be used for the virtual keyboard 76, including a Dvorak keyboard layout, a reduced keyboard layout, or keyboards adapted for non-English languages.

The virtual keyboard 76 may comprise displayed keys 502, each having an associated alphanumeric character or symbol, although in this example only characters are shown. The displayed keys 502 may be separated from each other by visible boundaries.

Figure 5B:
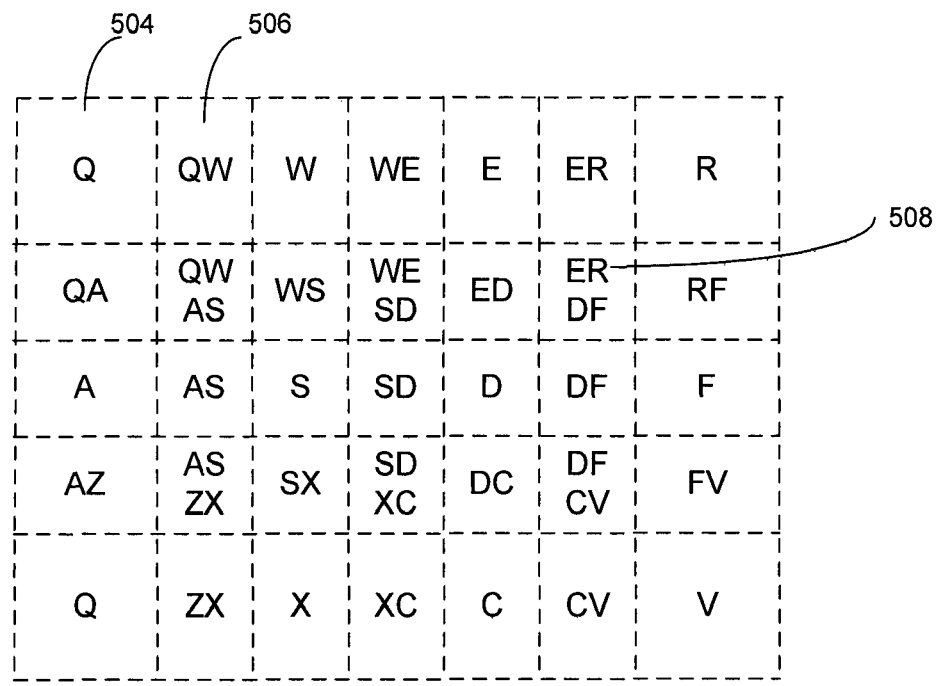
FIG. 5B is a depiction of subregions of the virtual keyboard of FIG. 5A.

The virtual keyboard 76 may be divided into subregions 504, 506, 508. FIG. 5B shows an example of alphabetic characters associated with each subregion 504, 506, 508. Subregions 504, 506, 508 are not displayed to the user, but are defined by the input determination module 402 to determine candidate input character(s) or symbol(s). Although not shown, there may also be subregions that do not have any associated character(s) or symbol(s). For example, the virtual keyboard 76 may include modifier keys or function keys, such as "CAPS LOCK", "ALT", "SYM" or "SHIFT". Subregions for such keys would not be associated with any character or symbol. In some cases, the virtual keyboard 76 may be restricted, at least temporarily, to input only from a subset of keys from those displayed. For example, for entering input into a hexadecimal field, the virtual keyboard 76 may be restricted to the alphabetic characters "A" through "F" and the numeric characters "0" through "9", with the remaining keys greyed out, such that touching or otherwise actuating any greyed out area will not result in any input. The subregions for such greyed out or excluded areas may be associated with no input character or symbol, and such greyed out or excluded subregions may be indicated in the subregion map 406 as being associated with no character or symbol, at least temporarily. For the purpose of the present disclosure, such subregions may be referred to as empty subregions, meaning that there are no associated input character(s) or symbol(s) for such regions, although there may be other associated selections, such as a function or a modifier.

In the example shown in FIGS. 5A and 5B, subregion 504 lies entirely within the boundaries of a displayed key 502 and is associated with the single character of that displayed key 502, namely letter "Q". Subregion 506 straddles two adjacent displayed keys 502 and is associated with the characters of the two adjacent displayed keys 502, namely letters "Q" and "W". Subregion 508 straddles four adjacent displayed keys 502 and is associated with the characters of the four displayed keys 502, namely letters "E", "R", "D", and "F". Although not shown, a subregion may also be defined on the virtual keyboard 76 as straddling one or more character(s) and/or symbol(s) as well as one or more modifier or function key. Such a subregion may be associated with the character(s) and/or symbol(s) it straddles, for the purpose of text prediction. The association between each subregion 504, 506, 508 and the respective associated character(s) and/or symbol(s) may be stored in the subregion map 406. Similarly, empty subregions may be defined in the subregion map 406 as having no associated character(s) and/or symbol(s).

The subregions 504, 506, 508 shown are for the purpose of illustration only and the virtual keyboard 76 may be divided into different subregions than those shown. The subregions may be uniform or non-uniform in shape and/or size. Where different keyboard layouts are possible, the subregions may be different in shape, size and/or number for each keyboard layout. Each subregion may be associated with one, two, three, four or more displayed characters and/or symbols, or may be an empty subregion. In some embodiments, all subregions are associated with no more than one character or symbol.

Figure 6:
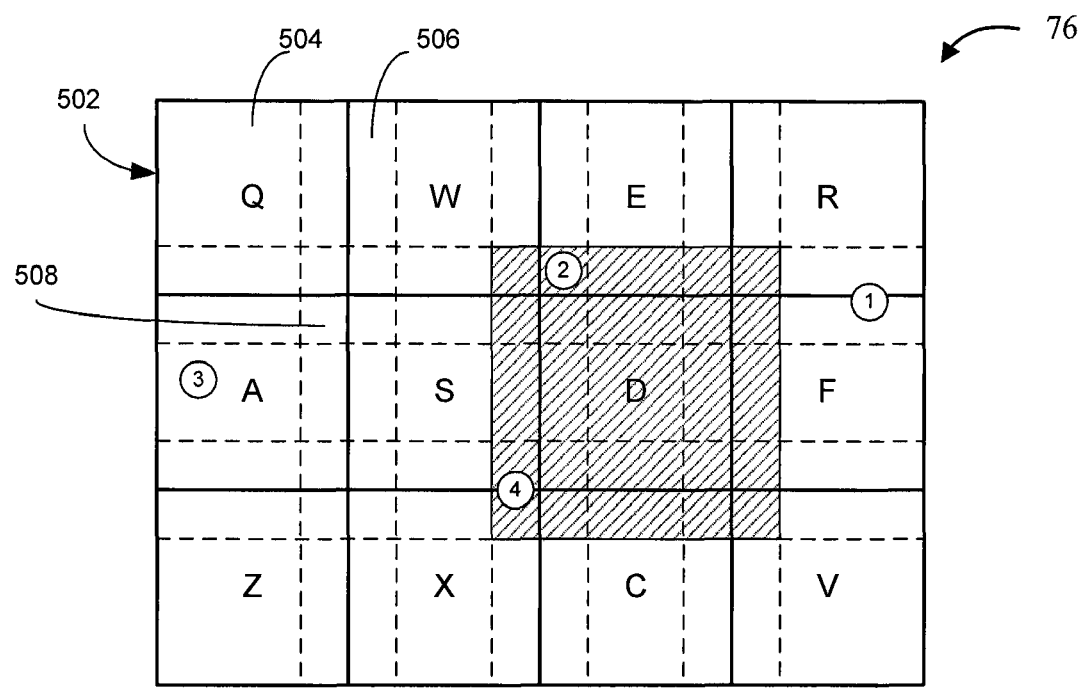
FIG. 6 is a simplified example of the virtual keyboard of FIG. 5A in use.
Figure 6:
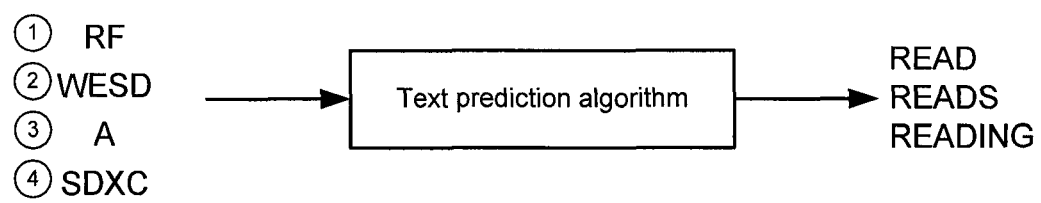

FIG. 6 illustrates an example of how a text prediction algorithm may be applied to a virtual keyboard 76 in accordance with an embodiment of the present disclosure. Similar to FIGS. 5A and 5B, a simplified version of the virtual keyboard 76 is shown for simplicity.

The virtual keyboard 76 is shown in FIG. 6 with points (1), (2), (3) and (4), indicating successive user input touch points on the virtual keyboard 76. As shown, the user input may miss the centre of the displayed key 502 and may be at the border of two or more displayed keys 502 or may be outside the displayed boundaries of an intended displayed key 502. This input is processed at the input determination module 402 to determine the candidate character(s) or symbol(s) for each input. In this example, the input points correspond to subregions RF, WESD, A and SDXC. Hence, each instance of the user input may result in one or more characters or symbols being determined as candidate input. These characters or symbols are provided to the text prediction module 404. A text prediction algorithm is applied to the candidate character(s) and/or symbol(s), and in this instance the text "READ", "READS" and "READING" is predicted. Although the predicted text is shown as being provided after an input sequence, the text prediction algorithm may provide predicted text at any point in an input sequence, such as before any complete word is inputted. Although the text prediction algorithm is shown being applied to a sequence of alphanumeric characters, the text prediction algorithm may be applied to a sequence of characters and/or symbols. If a touch point corresponds to an empty subregion, the subregion map will indicate that there is no associated character or symbol, and no input from that touch point may be provided to the text prediction module 404. Other modules may carry out other modifiers and/or functions based on input at an empty subregion.

Notably, input point (4) lies entirely outside the displayed key 502 for the alphabetic character "D". However, because subregions 504, 506, 508 are used to determine the candidate characters or symbols for each input, the character "D" may still be included in the candidate characters and/or symbols provided to the text prediction module 404 as a possible candidate input. That is, the use of subregions 504, 506, 508 which may be associated with more than one character or symbol creates an actual region larger than the displayed key 502 that still notes the character or symbol of the displayed key 502 as a candidate character or symbol for text prediction. In this example, input anywhere within the shaded region shown results in a determination that the character "D" may be a candidate input. This may help to improve the accuracy and/or effectiveness of a text prediction algorithm for the virtual keyboard 76.

Figure 7:
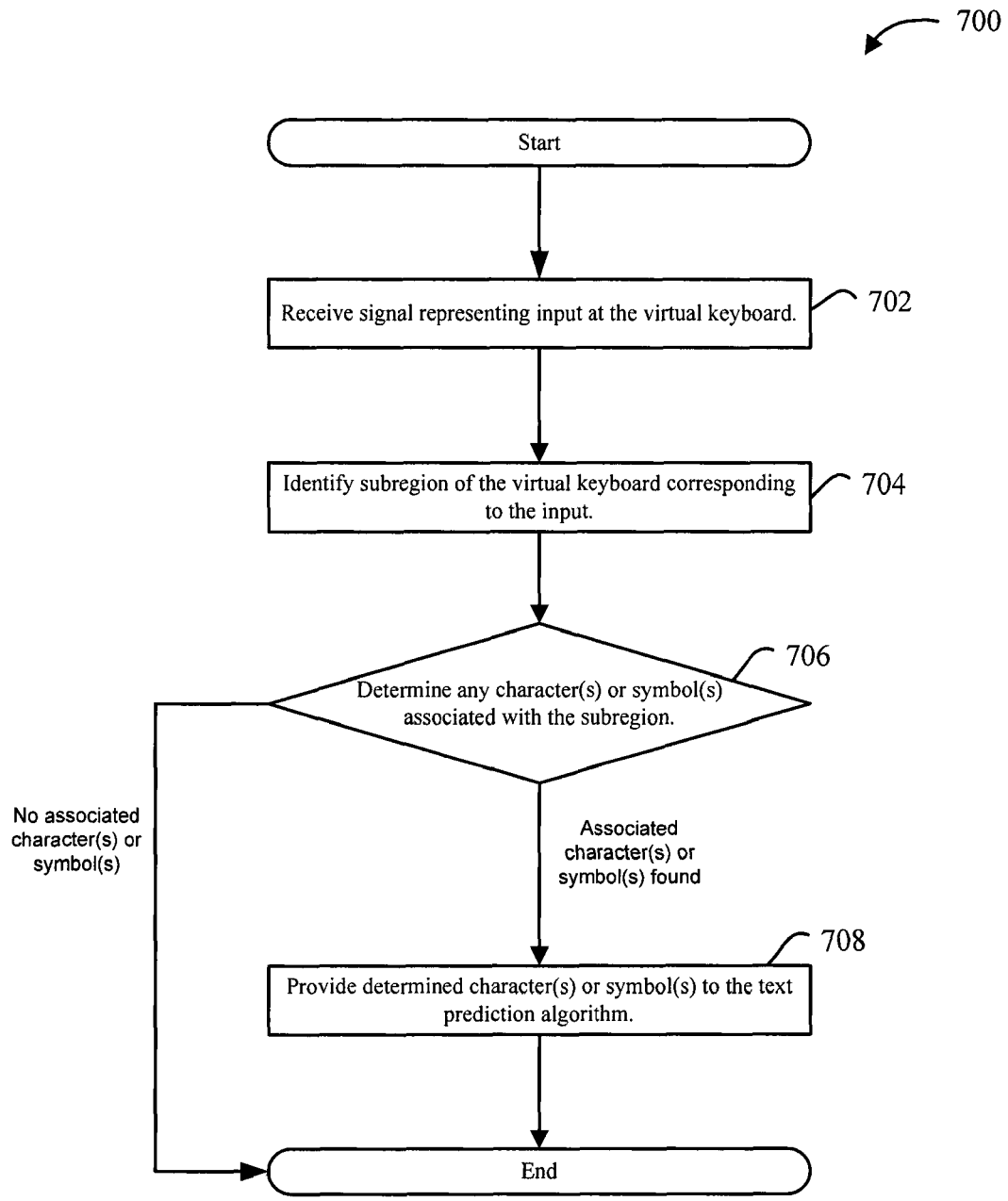
FIG. 7 is a flow chart showing a general method for applying text prediction algorithm to a virtual keyboard in accordance with an embodiment of the present disclosure.

Reference is now made to FIG. 7, showing a flowchart depicting a general method for applying a text prediction algorithm to the virtual keyboard 76. The method 700 may take place at the input determination module 402.

At 702, a signal representing an input at the virtual keyboard 76 is received. This signal may be sent from the main processor 22 in response to a detected user input at the virtual keyboard 76. As described above, the signal may be sent upon detection of a touch event. The signal may include X and Y position information for the input.

At 704, a subregion of the virtual keyboard 76 corresponding to the input is identified. The subregion may be identified using the X and Y position information.

At 706, any character(s) and/or symbol(s) associated with the identified subregion are determined. This may be carried out by input determination module 402 by referring to the stored subregion map 406 listing the appropriate subregion for each X and Y position. Where the input determination module 402 is configured to accommodate more than one keyboard layout, the appropriate subregion map 406 for the virtual keyboard 76 currently in use may be selected from a plurality of stored subregion maps 406. Where the identified subregion is an empty subregion, this is indicated in the subregion map 406, and there is no associated character or symbol. If any associated character(s) and/or symbol(s) are found, the method 700 proceeds to 708. If there are no associated character(s) and/or symbol(s), there is nothing to be provided for text prediction and the method 700 ends.

At 708, the determined character(s) and/or symbol(s) is provided to the text prediction algorithm. In an embodiment where the text prediction algorithm resides in the text prediction module 404 separate from the input determination module 402, a signal may be sent from the input determination module 402 to the text prediction module 404 representing the determined character(s) and/or symbol(s).

Although not shown, the method 700 may also include determining a predicted text based on determined character(s) and/or symbol(s) using the text prediction algorithm. This may be carried out at the text prediction module 404, using commonly known text prediction techniques. The predicted text may then be transmitted, for example a signal representing the predicted text may be transmitted to the processor 22. The predicted text may be suggested to the user, for example by displaying it on the display 32. There may be two or more predicted text, for example where the text prediction algorithm is applied to an input sequence for an incomplete word. In such cases, a list of predicted text may be displayed on the display 32 for the user to select from.

Where there is a subregion that straddles one or more input character or symbol and one or more modifier or function, the text prediction algorithm may be provided with information about the modifier or function, in additional to the character or symbol. The text prediction algorithm may predict that the modifier or function is more likely as an intended input than the character or symbol, in which case the text prediction algorithm may transmit a signal to another module, such as a keyboard module, to carry out the predicted modifier or function. If the text prediction algorithm predicts that the character or symbol is more likely as an intended input, then the character or symbol may be used.

It will be appreciated that the process shown and described with reference to FIG. 7 is simplified for the purpose of the present explanation and other steps and substeps may be included. Alternatively, some of the steps and substeps may be excluded or may be performed in an order different from the order in which they are described without materially affecting the end results of the method 700. Although the method 700 is described as taking place at the input determination module 402, a person skilled in the art would understand that a module or modules similar to the input determination module 402 may be implemented as part of the other software modules on the portable electronic device 20. The steps described may be carried out by a single module or may be carried out by several different modules.

In the following description, for purposes of explanation, numerous details are set forth in order to provide a thorough understanding of the present disclosure. However, it will be apparent to one skilled in the art that these specific details are not required in order to practice the present disclosure. In other instances, well-known electrical structures and circuits are shown in block diagram form in order not to obscure the present disclosure. For example, specific details are not provided as to whether the embodiments of the disclosure are implemented as a software routine, hardware circuit, firmware, or a combination thereof.

Embodiments of the present disclosure may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the present disclosure. Those of ordinary skill in the art will appreciate that other instructions and operations necessary to implement the present disclosure may also be stored on the machine-readable medium. Software running from the machine-readable medium may interface with circuitry to perform the described tasks.

The present disclosure is also directed to an apparatus for carrying out the disclosed method, including apparatus parts for performing each described step, be it by way of hardware components, a computer programmed by appropriate software to enable the practice of the disclosed method, by any combination of the two, or in any other manner. A computer data signal carrying computer readable program instructions may also direct an apparatus to facilitate the practice of the disclosed method. It would be understood that such apparatus, articles of manufacture, and computer data signals also come within the scope of the present disclosure.

While the embodiments described herein are directed to particular implementations of the portable electronic device and the method of controlling the portable electronic device, it will be understood that modifications and variations may occur to those skilled in the art. All such modifications and variations, including all suitable current and future changes in technology, are believed to be within the sphere and scope of the present disclosure.

The invention claimed is:

1. An electronic device for text prediction in a virtual keyboard, the device comprising:
    a microprocessor for controlling the operation of the device;
    a touch screen display coupled to the microprocessor for accepting user input and for displaying a user interface including the virtual keyboard, the virtual keyboard being configured to receive input from a subset of a plurality of displayed keys with remaining ones of the plurality of displayed keys greyed out; and
    a memory coupled to the microprocessor;
    the memory including an input determination module for execution by the microprocessor, the input determination module being configured to:
        receive signals representing input at the virtual keyboard, the virtual keyboard being divided into a plurality of subregions of non-uniform shape and size each corresponding to one or more of the plurality of displayed keys, the plurality of subregions including at least one subregion associated with two or more characters and/or symbols of the virtual keyboard;
        identify one of the subregions on the virtual keyboard as corresponding to the input;
        determine all characters and/or symbols associated with the identified subregion; and
        automatically provide all of the determined characters and/or symbols to a text prediction algorithm.

2. The system of claim 1 wherein the memory is further configured to:
    determine a predicted text based on the characters and/or symbols using the text prediction algorithm; and
    transmit a signal representing the predicted text.

3. The system of claim 1 wherein determining the characters and/or symbols associated with the identified subregion comprises mapping the identified subregion to any associated character or symbol using a subregion map.

4. The system of claim 1 wherein the plurality of subregions comprise at least one of: an empty subregion having no associated character or symbol, a single-character subregion defined within displayed boundaries of a single displayed character or symbol and associated with the displayed character or symbol, a two-character subregion defined to overlap two displayed characters or symbols and associated with the two displayed characters or symbols, and a four-character subregion defined to overlap four displayed characters or symbols and associated with the four displayed characters or symbols.

5. The system of claim 1 wherein the virtual keyboard corresponds to a QWERTY keyboard layout, a AZERTY keyboard layout, a QWERTZ keyboard layout, a Dvorak keyboard layout, a telephone keypad, or a reduced keyboard layout.

6. The system of claim 1 wherein the text prediction algorithm is selected from the group consisting of: SureType™, T9™, iTap™, and LetterWise™.

7. A method for text prediction in a virtual keyboard of an electronic device, the device having a touch screen display for accepting user input and for displaying the virtual keyboard, the virtual keyboard being configured to receive input from a subset of a plurality of displayed keys with remaining ones of the plurality of displayed keys greyed out, the method comprising:
    receiving signals representing input at the virtual keyboard, the virtual keyboard being divided into a plurality of subregions of non-uniform shape and size each corresponding to one or more of the plurality of displayed keys, the plurality of subregions including at least one subregion associated with two or more characters and/or symbols of the virtual keyboard;

identifying one of the subregions on the virtual keyboard as corresponding to the input;

determining all characters and/or symbols associated with the identified subregion; and automatically providing all of the determined characters and/or symbols to a text prediction algorithm.

8. The method of claim 7 further comprising:

determining a predicted text based on the determined characters and/or symbols using the text prediction algorithm; and transmitting a signal representing the predicted text.

9. The method of claim 7 wherein determining the characters and/or symbols associated with the identified subregion comprises mapping the identified subregion to any associated character or symbol using a subregion map.

10. The method of claim 7 wherein the plurality of subregions comprise at least one of: an empty subregion having no associated character or symbol, a single-character subregion defined within displayed boundaries of a single displayed character or symbol and associated with the displayed character or symbol, a two-character subregion defined to overlap two displayed characters or symbols and associated with the two displayed characters or symbols, and a four-character subregion defined to overlap four displayed characters or symbols and associated with the four displayed characters or symbols.

11. The method of claim 7 wherein the virtual keyboard corresponds to a QWERTY keyboard layout, a AZERTY keyboard layout, a QWERTZ keyboard layout, a Dvorak keyboard layout, a telephone keypad, or a reduced keyboard layout.

12. The method of claim 7 wherein the text prediction algorithm is selected from the group consisting of: SureType™, T9™, iTap™, and LetterWise™.

13. A computer program product having a computer readable medium having computer executable instructions tangibly recorded thereon for text prediction in a virtual keyboard of an electronic device, the device having a touch screen display for accepting user input and for displaying the virtual keyboard, the virtual keyboard being configured to receive input from a subset of a plurality of displayed keys with remaining ones of the plurality of displayed keys greyed out, the computer program product comprising:

code for receiving signals representing input at the virtual keyboard, the virtual keyboard being divided into a plurality of subregions of non-uniform shape and size each corresponding to one or more of the plurality of displayed keys, the plurality of subregions including at least one subregion associated with two or more characters and/or symbols of the virtual keyboard;

code for identifying one of the subregions on the virtual keyboard as corresponding to the input;

code for determining all characters and/or symbols associated with the identified subregion; and code for automatically providing all of the determined characters and/or symbols to a text prediction algorithm.

14. The computer program product of claim 13 further comprising:

code for determining a predicted text based on the determined characters and/or symbols using the text prediction algorithm; and code for transmitting a signal representing the predicted text.

15. The computer program product of claim 13 wherein determining the characters and/or symbols associated with the identified subregion comprises mapping the identified subregion to any associated character or symbol using a subregion map.

16. The computer program product of claim 13 wherein the plurality of subregions comprise at least one of: an empty subregion having no associated character or symbol, a single-character subregion defined within displayed boundaries of a single displayed character or symbol and associated with the displayed character or symbol, a two-character subregion defined to overlap two displayed characters or symbols and associated with the two displayed characters or symbols, and a four-character subregion defined to overlap four displayed characters or symbols and associated with the four displayed characters or symbols.

17. The computer program product of claim 13 wherein the virtual keyboard corresponds to a QWERTY keyboard layout, an AZERTY keyboard layout, a QWERTZ keyboard layout, a Dvorak keyboard layout, a telephone keypad, or a reduced keyboard layout.

18. The computer program product of claim 13 wherein the text prediction algorithm is selected from the group consisting of: SureType™, T9™, iTap™, and LetterWise™.

* * * * *